Jan. 12, 1932. R. W. SCHULTE 1,840,414
SOLDER CARRYING FITTING
Filed Jan. 27, 1931
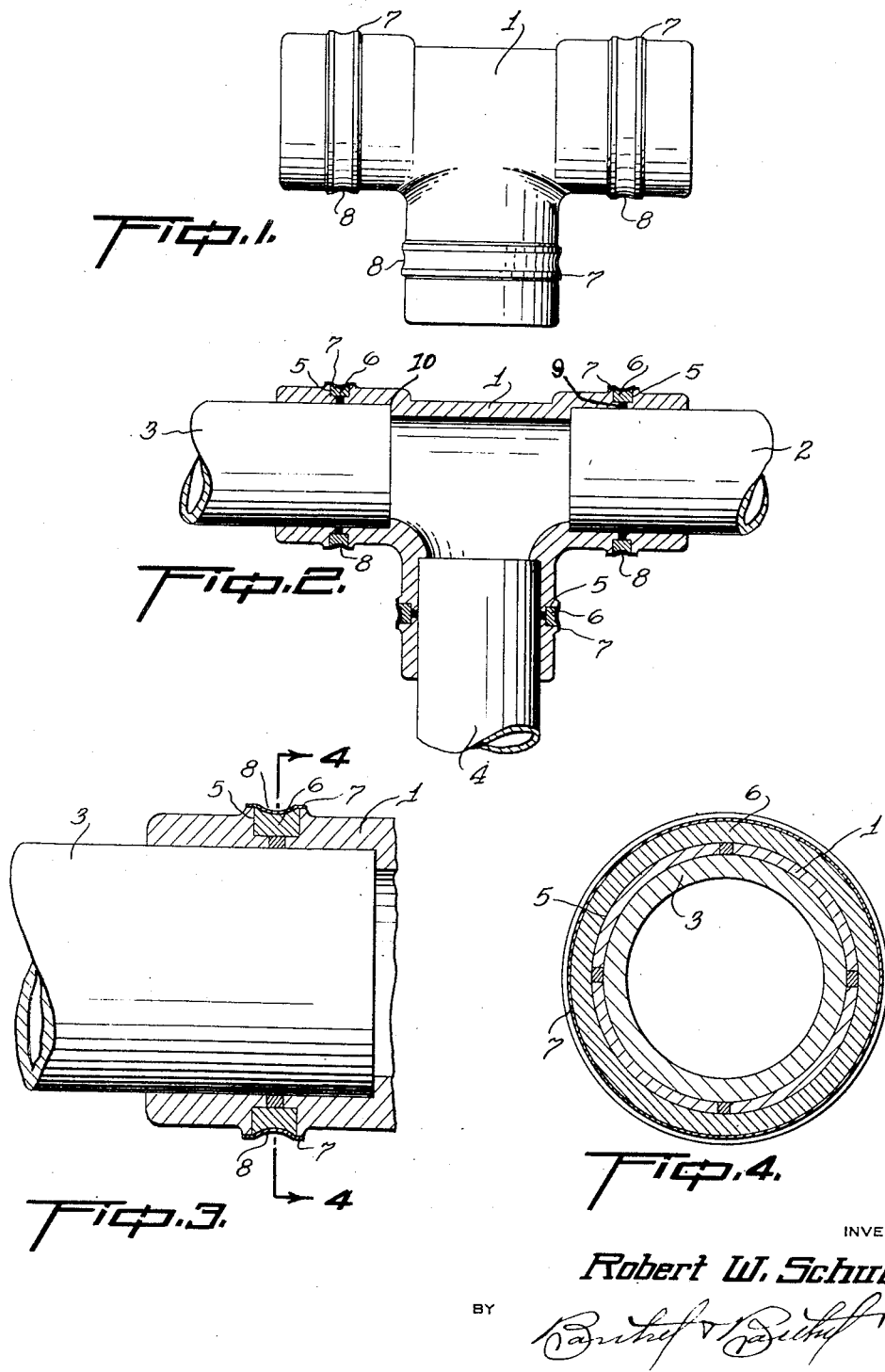
INVENTOR
Robert W. Schulte
BY
ATTORNEYS Patented Jan. 12, 1932

1,840,414

UNITED STATES PATENT OFFICE

ROBERT W. SCHULTE, OF DETROIT, MICHIGAN, ASSIGNOR OF FORTY PER CENT TO WILFRED F. CALDWELL, OF DETROIT, MICHIGAN

SOLDER CARRYING FITTING

Application filed January 27, 1931. Serial No. 511,571.

This invention relates to the method of and means for connecting or joining members, one of which is adapted to receive an end of the other member, and an object of this invention is to provide a connecting member or fitting which is a complete unit in and of itself and which may be shipped as such and may contain every element necessary for joining said member and fitting securely and firmly by a perfect solder or other similar joint and by simply inserting an end of the member in said fitting and then applying heat.

A further object is to so construct such a fitting, that it may form a carrier for solder or other similar uniting material and completely conceal and protect such material, and further, may provide for carrying a flux or other similar material in a manner to most effectively cooperate with such solder material in forming a perfect connection between said fitting and other member, and without any attention on the part of the workmen.

It is also an object to provide a fitting having the advantages of construction herein set forth and which is simple in construction and cheap to manufacture, the construction being such as to insure even distribution of soldering or similar material over the surfaces to be united and which is such as to give, during the uniting operation, an indication to the workmen, that the union is complete.

With the above and other ends in view, the invention resides in the matters hereinafter set forth and more particularly pointed out in the appended claims, reference being had to the accompanying drawings in which—

Figure 1 is a side elevation of a fitting illustrative of an embodiment of the present invention;

Fig. 2 is a longitudinal section through the same as applied in use;

Fig. 3 is an enlarged longitudinal section through an end portion of the fitting; and Fig. 4 is a transverse section substantially upon the line 4—4 of Fig. 3.

Referring to the drawings as illustrative of an embodiment of the present invention, 1 indicates the fitting as a whole which, as illustrated, is in the form of an ordinary T coupling for connecting the opposed ends of pipes or tubes 2 and 3 and a pipe or tube 4 extending at right angles to said tubes 2 and 3. These members 2, 3 and 4 may be tubular as shown or may be of any other form having cylindrical end portions, according to the use to which the construction is to be put, the ends of said members being adapted to be inserted within the tubular branches or sockets of the coupling or fitting.

The present invention contemplates the providing of a coupling or fitting for the purpose, which is adapted to embody the elements or materials necessary to form solder or similar joints between the branches of the fitting and the tube ends inserted therein, so that this fitting may be shipped as a unit to the place of use and is complete for installation, which installation may be effected by simply inserting the tube end or ends therein and then applying heat to the fitting. For this purpose, each branch of the fitting which is adapted to receive, loosely therein, a tube end portion, is formed, intermediate its ends with an encircling external groove 5 to receive a ring of solder 6 which is placed in the groove by melting the solder and allowing it to run into the groove until the groove is completely filled and the solder then allowed to harden, or it may be pressed into the groove in solid form.

To confine this solder ring within said groove and to protect and conceal it, a band or ring 7 of preferably, thin sheet metal is slipped over the fitting branch and groove therein after the placing of the solder in the groove, and this sheet metal ring is then contracted or otherwise secured in place upon the fitting branch exterior by spinning or pressing, or other means may be employed to firmly secure it in place over the groove and completely close the outer side thereof. When contracted by a spinning or pressing action, to hold this ring in place, it may be depressed into the groove slightly intermediate its edges, forming a shallow annular exterior groove in said ring as shown at 8, this pressing of said ring into the groove serving to also compress the solder ring in its groove so that it will completely fill every part of said groove. This confining ring 7 may, however, be secured in place tightly over the groove 5 in any other suitable manner.

To permit the solder to flow from each groove onto the surface of the tube end end inserted in the fitting, a hole or holes, preferably a plurality of holes 9, is provided in each branch of the fitting, opening into the bottom of each groove and through the inner surface of each branch or socket of the fitting intermediate the ends thereof, to permit the solder, when melted, to flow from each groove onto the surface of the tube end therein, and be evenly distributed over the tube end within the limited space between tube and fitting, said space being provided by relatively proportioning the diameters of tube end and bore of the fitting socket into which it is inserted, so that such space will be limited and cause an even distribution of the solder throughout this entire space. Due to the number of these holes 9 leading from each groove, the complete distribution of the solder throughout this space, is further insured, and if found desirable, an annular internal shoulder 10 may be provided at the inner end of the tube receiving socket of each branch, against which shoulder the inner end of each tube may abut to limit the movement of the tube end inwardly in the socket and to prevent solder from flowing into the fitting at the end of each tube, by closing the inner end of the space between each tube and socket interior surface. The opposite or outer end of each such spaces is, however, preferably left open so that as the solder flows in, the air may escape, and when the space is completely filled, the solder will issue from said open end of such space, thus affording an indication that the space is filled and a complete joint effected. The workman may, therefore, continue to apply heat to the fitting until the solder appears at the ends of the sockets, when he will know that the space is completely filled to form a perfect solder joint between fitting and tube end.

When a flux is to be used in connection with the solder or other material, this flux is preferably placed in the holes 9, completely filling said holes beneath the solder ring where, upon the heating of the fitting, it will flow into the space between the tube and socket and be evenly distributed over the surfaces to which the solder is to adhere and thoroughly prepare these surfaces for the solder just ahead of the solder flow. The melted solder will flow from the exterior groove through the several holes even though the ring 7 be tight, for gas given off by the melting solder and flux, will take the place of the solder in said groove.

With this construction and arrangement, the fitting when originally made up, is provided with all materials necessary in forming a solder joint and these materials are so held that they are concealed and protected, and will flow in the proper manner and be evenly distributed over every part of the surfaces to be united, insuring a perfect solder connection without any attention on the part of the workman or manipulation by him. Obviously there are decided advantages in providing a fitting which is complete to effect a perfect solder joint, and which may be sold and shipped as a unit, the solder and flux being in place therein and completely protected and ready for application upon the heating of the fitting after the insertion of the tube end or ends.

Obviously changes may be made in the construction of fitting, within the scope of the appended claims and such changes are contemplated.

Having thus fully described my invention, what I claim is:—

1. In a fitting for the purpose described having a socket portion with a groove in the exterior surface of said socket portion extending there around and opening into the interior of said socket, a material in said groove adapted to be rendered fluid by heat to flow into said socket and secure therein a member inserted in said socket, and means encircling said socket and secured over said groove to hold and conceal said material in said groove.

2. A fitting for the purpose described comprising a body having a socket portion to receive an end of another member, said socket portion having an encircling groove in its exterior surface with a plurality of holes in the bottom of said groove opening into the interior of said socket, a material in said groove adapted to be rendered fluid by heat and flow into said socket to secure therein a member inserted in said socket, and a flux material filling said holes and adapted to be rendered fluid by heat to flow into said socket ahead of said material in said groove.

3. A fitting for the purpose set forth, comprising a body having a socket to receive an end of a member to be secured thereto and an external groove extending around said socket and formed with holes in the bottom thereof opening into the interior of said socket, material filling said groove and adapted to be rendered fluid by heat and flow into said socket between the interior surface thereof and the said member inserted therein, and a band encircling said socket and secured in place over said groove to hold and conceal said material therein.

4. A fitting for the purpose set forth comprising a body formed with a socket opening through an end thereof to receive the end portion of a member to be attached thereto, said body being also formed with an external groove extending around said socket and a plurality of holes in the bottom of said groove opening into said socket, a solder material filling said groove, a flux material in said holes, and a band encircling said socket portion of said body and secured thereto over said groove to conceal said groove and hold said solder material in said groove.

5. A fitting for the purpose described, comprising a body having a cylindrical end portion forming a socket opening through the end thereof to receive an end portion of a member to be secured thereto, said cylindrical end portion of said body being formed with an annular groove in its exterior surface surrounding said socket and with a plurality of holes in the bottom of said groove opening into said socket, a solder material in said groove, a flux material in said holes, and a band encircling said cylindrical end portion of said body and secured thereto over said groove by depressing a central portion of said band inwardly of said groove.

In testimony whereof I affix my signature.

ROBERT W. SCHULTE.